United States Patent [19]

Miller et al.

[11] Patent Number: 5,212,354

[45] Date of Patent: May 18, 1993

[54] APPARATUS AND METHOD FOR DETECTING SEISMIC WAVES IN A BOREHOLE USING MULTIPLE CLAMPING DETECTOR UNITS

[75] Inventors: Mark A. Miller, Houston; J. Dave Fox, Stafford; Christine E. Krohn, Houston, all of Tex.

[73] Assignee: Exxon Production Research Company, Houston, Tex.

[21] Appl. No.: 652,333

[22] Filed: Feb. 7, 1991

[51] Int. Cl.$^5$ ............................................. G01V 1/00
[52] U.S. Cl. ................................... 181/108; 181/112; 367/57; 166/250; 73/152
[58] Field of Search .................. 181/105, 108, 112; 367/57; 166/250; 340/856, 857, 856.4; 73/152

[56] References Cited

U.S. PATENT DOCUMENTS

| | | | |
|---|---|---|---|
| 3,777,814 | 12/1973 | Gustavson et al. | 166/212 |
| 4,214,226 | 7/1980 | Narasimhan et al. | 367/57 |
| 4,578,785 | 3/1986 | Gelfand | 181/105 |
| 4,686,653 | 8/1987 | Staron et al. | 367/25 |
| 4,783,771 | 11/1988 | Paulsson | 181/108 |
| 4,819,760 | 4/1989 | Petermann | 367/911 |
| 4,881,207 | 11/1989 | Dubesset et al. | 367/31 |
| 4,901,289 | 2/1990 | Cretin et al. | 367/34 |

FOREIGN PATENT DOCUMENTS 0210925 2/1984 European Pat. Off. .

*Primary Examiner*—J. Woodrow Eldred
*Attorney, Agent, or Firm*—Pamela L. Wilson; Keith A. Bell

[57] ABSTRACT

An apparatus and method for detecting seismic waves traveling in an underground formation. The apparatus includes a hydraulic pressure source, preferably a downhole hydraulic pump; a plurality of small, light-weight, flexibly connected clamping detector units having hydraulically actuated clamps; conduit means connecting the hydraulic pressure source to the detector units so that the detector units may be hydraulically clamped to a wellbore with a large force by activation of the clamps; and means for conditioning signals from the detectors. The small, light-weight detector units are securely clamped to the side of the wellbore because of the high clamping force-to-weight ratio thereby allowing high frequency signals to be detected without interference.

15 Claims, 6 Drawing Sheets

APPARATUS AND METHOD FOR DETECTING SEISMIC WAVES IN A BOREHOLE USING MULTIPLE CLAMPING DETECTOR UNITS

FIELD OF THE INVENTION

The present invention relates to geophysical exploration apparatus and methods.

BACKGROUND OF THE INVENTION

Downhole detectors of seismic waves are well known in the art. A typical prior art tool includes the following elements in a single housing: sensors, such as geophones, that convert mechanical vibrations into electrical signals; associated electronics; a clamp that fastens the tool to the borehole wall; and a motor that actuates the clamp. These downhole detectors are large with lengths as long as 6 feet and weights as much as 160 pounds. They often have the capacity to clamp in holes with diameters ranging from 5 inches to over a foot.

During acquisition of seismic data, the detector is lowered into a well and clamped at a desired depth. Seismic waves are created by conventional sources and detected by the tool. The tool is then lowered to a new depth, and the process is repeated. In the most common configuration, data can be recorded by only one detector unit at one depth at a time. Recently, new tools have been devised which can record data simultaneously from several detectors locked at different depths as disclosed in European Patent Application 0210925. This prior art tool comprises a seismic detector and a magnetic clamp in an open cradle carrier which can be secured to a cable linking several such devices into an array. The size of the detectors is still a limiting factor on detector spacing, however.

The large size of prior art detectors also limits the frequencies of the seismic signals that can be recorded. Prior art downhole detectors are limited by internal mechanical resonances of the tool and by the force with which the tool is clamped to the borehole wall. Resonances caused by the flexing of a tool body can interfere with the recording of the seismic signals. The larger the tool, the lower the resonant frequencies, and the greater the interference. With a poor clamp, the detector will follow the motion of the borehole wall for low frequencies, but will not couple to the wall at higher frequencies. It is well known that better coupling resulting in detection of higher frequencies is achieved with a greater clamping force-to-weight ratio for the tool. Typical frequency detection limits for prior art geophones are 200 to 300 Hertz.

There are a number of applications, such as that disclosed in U.S. Pat. No. 4,214,226 to Narasimhan et al., which require high-frequency data (1000 Hz) recorded at many different depths in the well. Prior art tools are inadequate to record the higher frequencies for the reasons discussed above. Furthermore, to record this data in a minimal period of time, it is important that data be simultaneously recorded at a number of depths by multiple detectors in the well. There is also an application disclosed in U.S. Ser. No. 430,513 to Krohn which requires multiple detectors spaced at two-foot separations in the well. The prior art tools are too long to be spaced two feet apart. These applications involve operations in uniform wellbores that are often cased, however. Thus, the capacity to record data at a large range of borehole diameters with a single tool configuration is not required.

SUMMARY OF THE INVENTION

In the practice of one embodiment of the present invention, small, light-weight, flexibly connected clamping detector units are clamped to a wellbore with a large force. The small size and weight of each detector unit is achieved by removing apparatus that operates the clamp from the unit. A high force-to-weight ratio can then be obtained by use of hydraulically actuated locking arms located on the detector units. The high force-to-weight ratio allows the detector unit to press tightly against a wellbore and thus overcome the problems of prior art clamping detector units wherein high frequency signals are not recordable because of poorly clamped detector units. Furthermore, the small size of the detector units allows spacing distances as short as two feet to be achieved, thus overcoming another problem of prior art tools.

One embodiment of the present invention is directed to an apparatus having the following principle features for detecting seismic waves in a borehole: an hydraulic pressure source; a plurality of small, light-weight, flexibly connected clamping detector units having hydraulically actuated clamps; conduit means connecting the hydraulic pressure generating source to said detector units so that the detector units may be hydraulically clamped to a wellbore with a large force by activation of the clamps; and means for conditioning signals from the detectors and transmitting them to the surface of the borehole.

A preferred embodiment of the present invention is an apparatus for detecting seismic waves comprising a downhole hydraulic pump; a plurality of small, light-weight, flexibly connected clamping detector units wherein each detector unit comprises at least one geophone enclosed in a light-weight housing; an arm moveable radially outward to contact a borehole wall; a piston unit cooperating with said arm that converts hydraulic pressure to mechanical motion to move the arm; conduit means connecting the hydraulic pump to the detector units so that the detector units may be hydraulically clamped to a borehole with a large force by activation of the locking arms; and a digitizer connected to the geophones by a plurality of wires. The digitized signal may then be transmitted up a standard wire line to the surface.

BRIEF DESCRIPTION OF THE DRAWINGS

For a better understanding of the present invention, reference may be had to the drawings in which.

These drawings are not intended to in any way define the present invention, but are provided solely for the purpose of illustrating certain preferred embodiments and applications of the present invention.

DESCRIPTION OF THE PREFERRED EMBODIMENT

Figure 1:
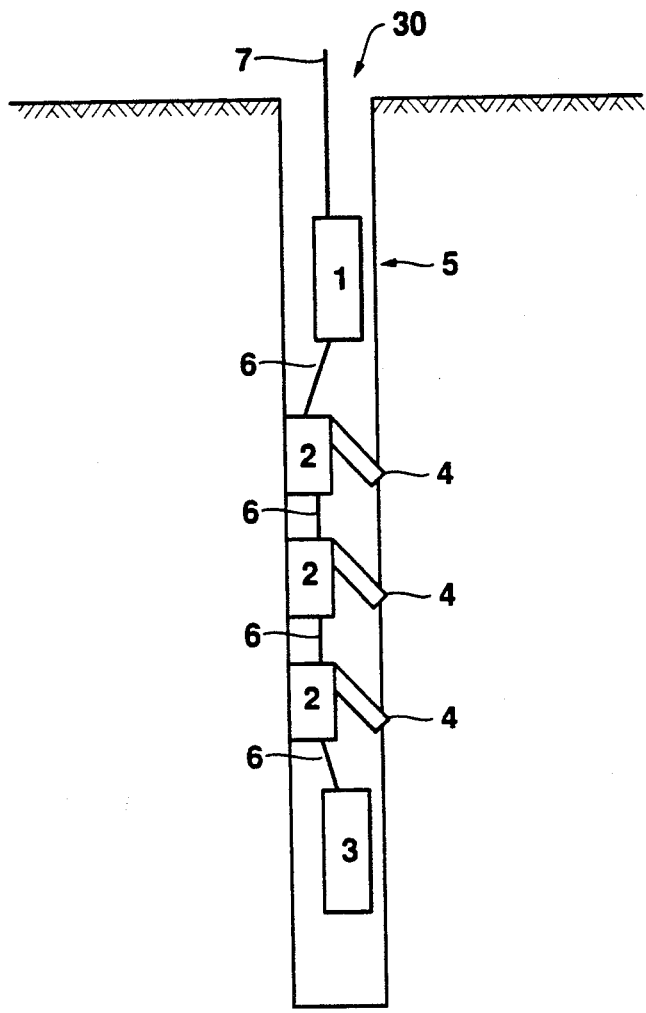
FIG. 1 is a schematic illustration showing an embodiment of the invention in use in a wellbore.

The components of a downhole tool 30 of the present invention are shown in FIG. 1. The various components of a preferred embodiment of the tool include a digitizing and electronics pod or digitizer 1, a number of clamping detector units 2, and a downhole hydraulic pump 3. The various components may be arranged in different orders. Digitizer 1 may be used as a means for conditioning signals from detector units 2. Detector units 2 each comprise at least one geophone enclosed in a light-weight housing. Each detector unit 2 includes an arm 4 which presses the unit against a borehole wall 5. Hydraulic pump 3 supplies hydraulic pressure to activate arms 4 of detector units 2. Flexible cables 6 located between each of the detector units 2 carry a stress member, electrical wires for each of the geophones and a single hydraulic hose. Because the cable is not rigid, signals cannot be mechanically passed between clamping units 2 and interference with the signals is thereby avoided. The top of the digitizer fastens to a standard wireline 7 for communication to the surface.

In another embodiment of the invention, hydraulic pressure may be generated at the surface and transferred to the clamping detector units by a custom cable 7 running from the surface to the bottom of the tool, that incorporates a hydraulic line in addition to electrical wires. Alternately, a hydraulic line may be run separately from the standard wireline 7. Care must be taken to purge the hydraulic line to remove all air. The line is connected to a pump at the surface. Pressure exerted by the pump may be conveyed downhole by the hydraulic line to activate the clamps 4 thereby clamping the detector units to the wellbore. This line must be able to withstand the differential pressure between the top and the bottom of the well. Consequently, this method is generally limited to shallow depths of less than 2000 feet.

In still another embodiment of the invention, means for conditioning signals from the detector units may comprise a special line instead of a digitization unit. The line may comprise a stress member to support the tool, a pair of wires for each detector to send electrical signals from the detector to the surface, and wires to supply power to downhole electronics. The signals received at the surface are digitized and stored using conventional methods. If more than three detectors are used, the line may need to be specially made because standard wirelines contain only seven conductors.

Figure 2:
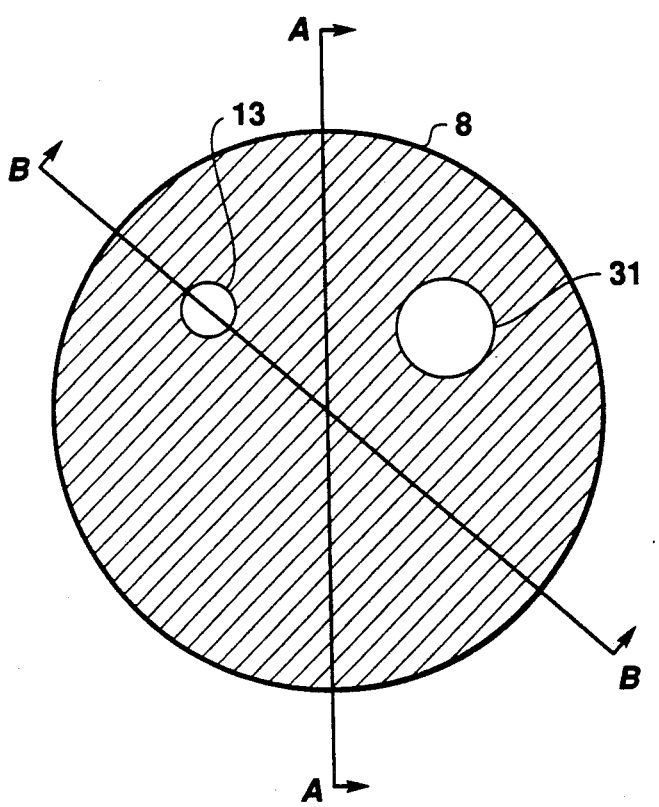
FIG. 2 is a cross sectional view of an embodiment of the clamping detector unit of the present invention.
Figure 3:
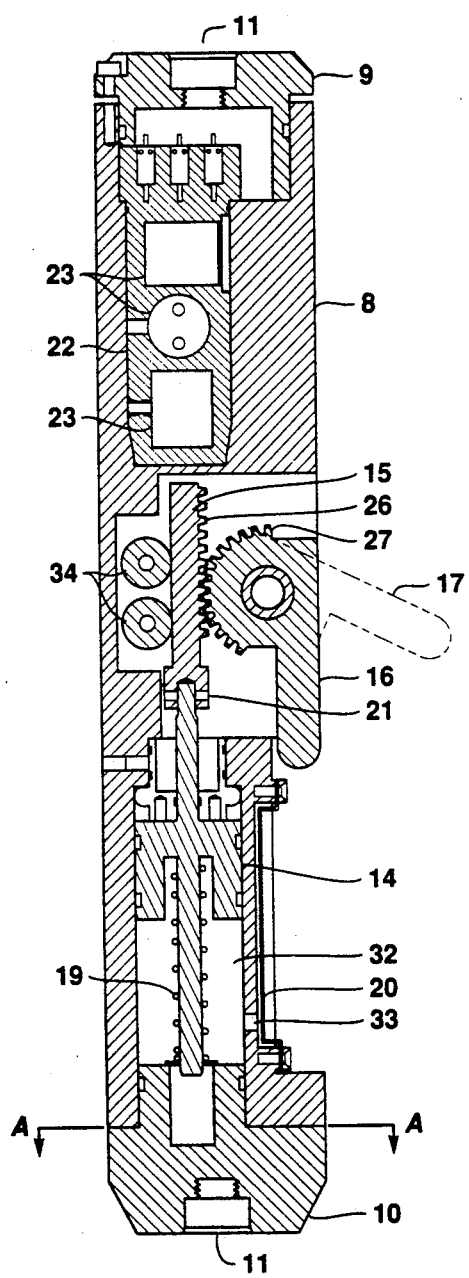
FIG. 3 is a pictorial sectional view of a clamping detector unit of the present invention taken along line A—A of FIG. 2.
Figure 4:
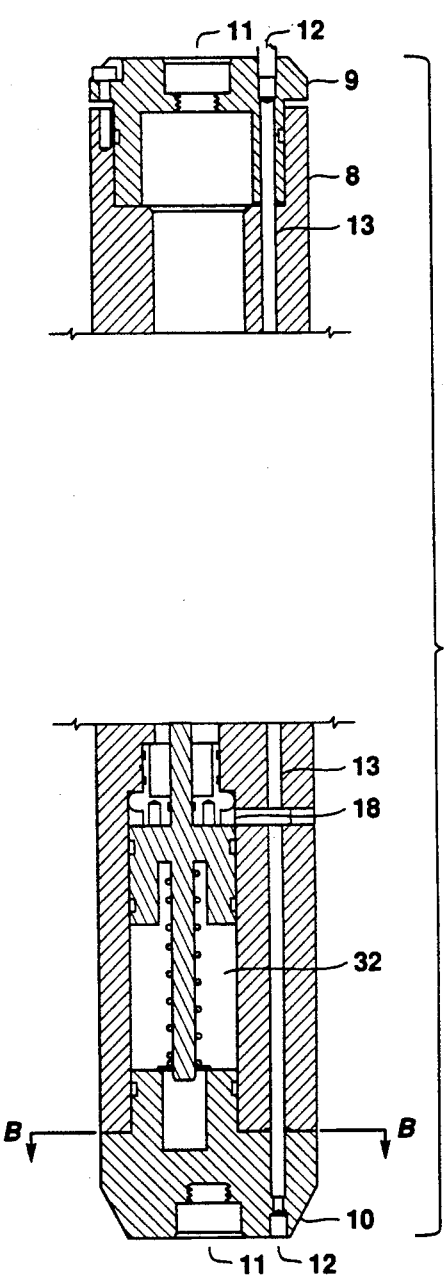
FIG. 4 is a pictorial sectional view of a clamping detector unit of the present invention taken along line B—B of FIG. 2.

Crossections of an individual clamping detector unit 2 are shown in FIGS. 2-4. The housing 8 of detector unit 2 is preferably made out of titanium or other light-weight material. End pieces 9 and 10 of detector unit 2 contain electrical connectors 11 and hydraulic connectors 12. A port 13 is cut through the body of detector unit 2 to pass the hydraulic pressure to the other units via the hydraulic hose. A similar port 31 located out of the plane of the drawing acts as a passageway for the electrical wires. Connector 11 is a stress terminated bulkhead connector commonly available in the industry. An alternative method of connecting electrical wires to the individual clamping units involves running the electrical wires through port 31 without terminating the wires. The tool and the cable surrounding the wires are flooded with oil, and the stress members of the cables are fastened to the tool end pieces.

A piston 14 is used to pull a rack 15 containing teeth 26. The teeth 26 mesh with teeth 27 on arm 16 that opens against the borehole wall. Rack supporting bearings 34 give support to rack 15 and allow rack movement upon application of hydraulic pressure in piston 14. The open position 17 is shown in FIG. 3. The length of arm 16 can be varied to accommodate borehole diameter. A cross-port 18 admits hydraulic fluid to create pressure on piston 14 through port 13. As pressure is created on piston 14, the piston moves downward displacing fluid from piston cavity 32 through bladder port 33 and into equalization means or expanding bladder 20. Bladder 20 is used to equalize pressure in the piston cavity 32 with borehole pressure at the depth of the individual unit. Because of the bladder, a second hydraulic return line to the pump is not needed to relieve pressure caused by the fluid displaced from piston cavity 32. A spring 19, attached between piston 14 and the lower end of piston cavity 32, may be used to retract arm 16 when pressure on piston 14 is released. A shear pin 21 may be present to allow arm 16 to collapse upon exertion of upward force if the unit is required to be pulled out of the hole. The entire piston and rack assembly can be removed from the body of the tool in one part for repair by removing end piece 10 and then moving arm 16 perpendicular to unit 30 so that arm 16 disengages.

Also shown in FIG. 3 is a geophone holder 22 containing three geophones 23. Geophones 23 are commercially available from Oyo Geospace. Accelerometers may also be used in place of geophones 23. Geophones 23 are oriented in three different orthogonal directions. Each geophone 23 may be fastened into holder 22 with a set screw, and holder 22 may be screwed into housing 8 of detector unit 2.

Figure 5:
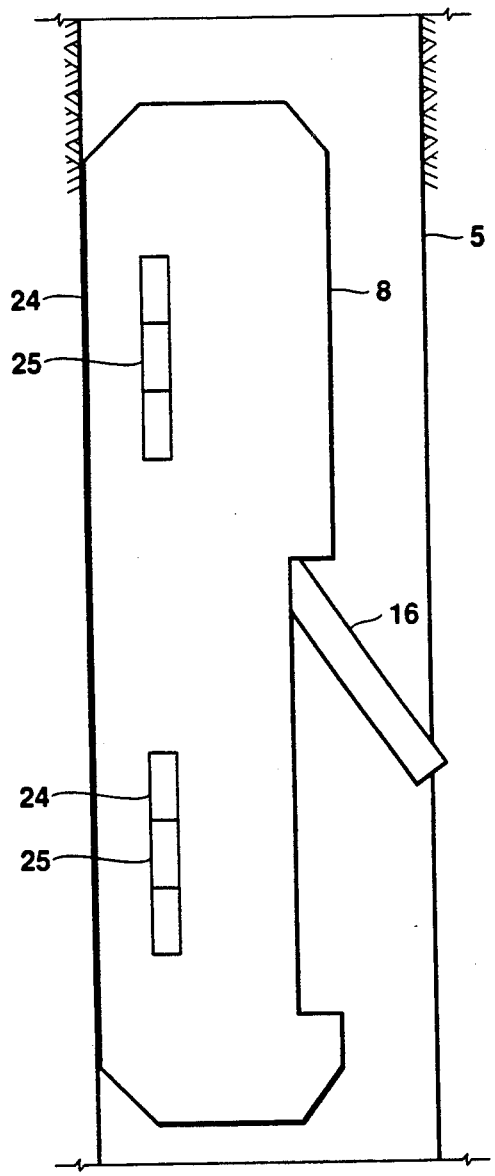
FIG. 5 is a schematic illustration of the clamping detector unit of the present invention clamped to a wellbore.
Figure 6:
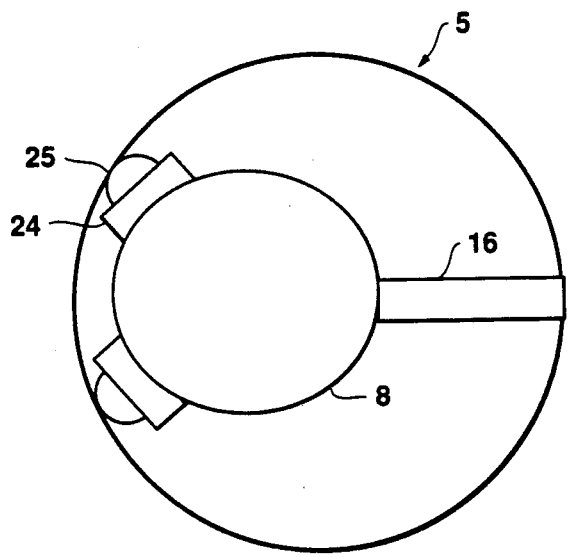
FIG. 6 is a top view of FIG. 5 looking down the wellbore.

In order to couple geophone holder 22 to a borehole to sense motion of the wall of borehole perpendicular to arm 16, conventional standoffs horizontally offset from arm 16 may be used to contact the borehole wall as shown in FIGS. 5 and 6. Four standoffs 24, two of which are not shown, may be attached to housing 8 of detector unit 2. Pairs of standoffs 24 are located at the top and bottom of detector unit 2, and standoffs 24 in each pair may be located at angles of 45 to 60 degrees from the plane containing arm 16. Standoffs 24 may contain a raised rounded foot 25 which contacts borehole wall 5 and which allows the unit 2 to rotate in the process of extending arm 16.

In the practice of an embodiment of the present invention, components 1, 2, and 3 are first assembled using connecting cables 6. The assembly may be attached to a standard wireline 7 and lowered into a well to a preselected depth. Signals are sent from wireline 7, through cables 6 to hydraulic pump 3 to activate the application of pressure to the hydraulic line connecting pump 3 with clamping detector units 2. At each clamping unit 2, the increased pressure on the piston 14 at crossport 18 causes the arm to open and to apply a large force on the borehole wall. The force against the borehole wall will match the differential pressure between the working side of the piston and the piston cavity that is equalized to the borehole pressure by expanding bladder 20. After units 2 are clamped, a seismic source is activated, and a trigger is sent to the digitization unit to begin recording signals from the geophones. The digitized records may then be transferred in sequence up wireline 7 to a computer system at the surface for evaluation and storage. Additional seismic recordings can then be made using the same depth location of the tool. To move the tool, a signal may be sent to reverse the operation of the hydraulic pump. The negative differential pressure at pistons 14 in each clamping unit 2 and at springs 19 causes the arm to retract. The tool can be then moved to a new location and clamped, or it can be removed from the borehole.

In another aspect of this invention, a method is provided comprising clamping multiple light weight detector units in a borehole with a force-to-weight ratio greater than 8, more preferably greater than 10; activating a seismic source; and recording signals caused by such seismic source up to about 1000 Hertz. The clamping multiple light weight detector units may be clamped at depths from about 2 to about 25 feet apart and, more preferably, from depths from about 2 to about 5 feet apart.

One of the primary advantages of the present invention over the prior art is that each clamping detector unit is small and light-weight. This is achieved because the hydraulic pressure generating source has been removed from the detector unit housing. Because the detector units are small and light-weight, a plurality of detector units may be strung in a wellbore and positioned as close as from about 2 to about 50 feet apart from each other, and preferably positioned from between 2 to 25 feet apart. It is possible, with this inventive tool, to position the detectors from about 2 to about 5 feet apart. This allows recordings of signals from different depths simultaneously. Also because of the light weight of the detector units, a high clamp force-to-weight ratio exists allowing the unit to be held more securely to the wellbore than with prior art clamping units. Force-to-weight ratios of greater than about 8, and preferably greater than about 10 may be achieved by use of the present invention. This result allows the recording of higher frequency signals without interference from vibration of the detector unit.

Figure 7:
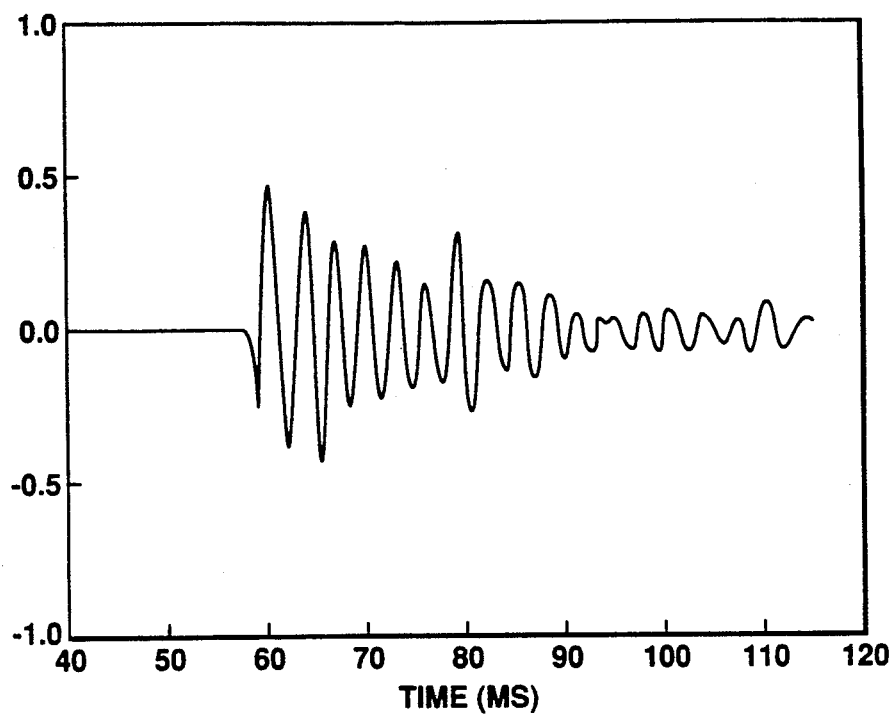
FIG. 7 is a plot of vertical motion recorded with a prior art tool.
Figure 8:
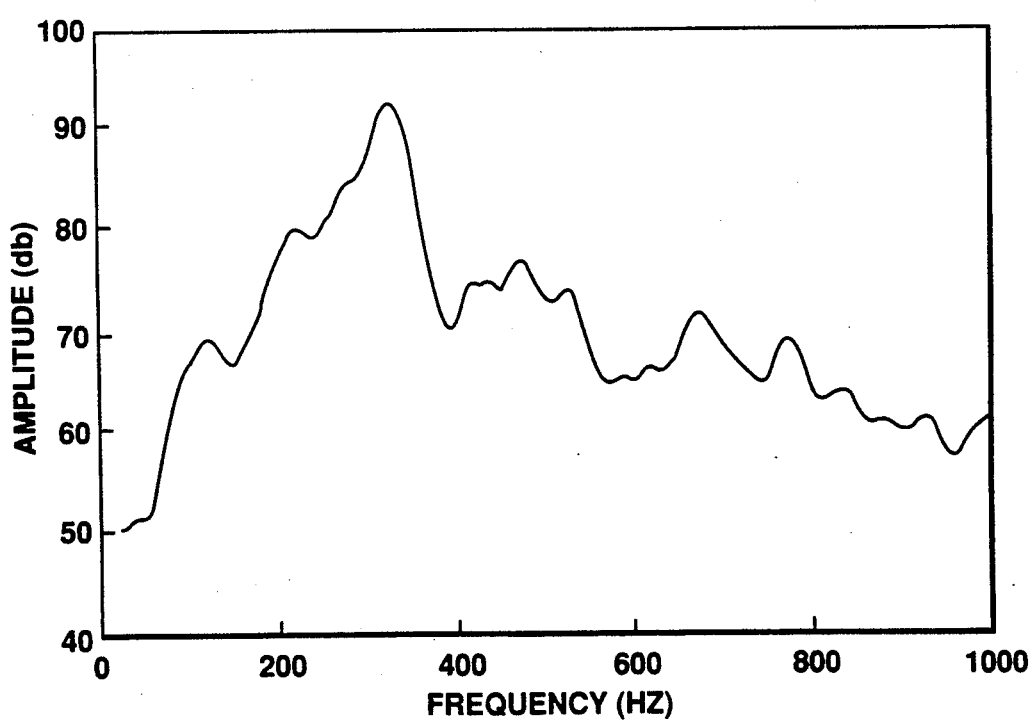
FIG. 8 is a plot of the amplitude spectrum for the data shown in FIG. 7.

Vertical motion recorded with a commercially available tool (SIE Geosource SWC-3C) is shown in FIG. 7. The tool was locked at a depth of 400 feet in a first well. A small dynamite charge was exploded at a depth of 200 feet in a second well approximately 250 feet from the first well. The data is ringy, or not well defined, and the ringy nature of the signal obscures multiple events. The amplitude spectrum for the data shown in FIG. 7 is displayed in FIG. 8. The spectrum shows a large amplitude peak at 300 Hertz that represents a coupling resonance. The data above 300 Hertz are not usable because of uncertainties in the phase of the data after a resonance.

Figure 9:
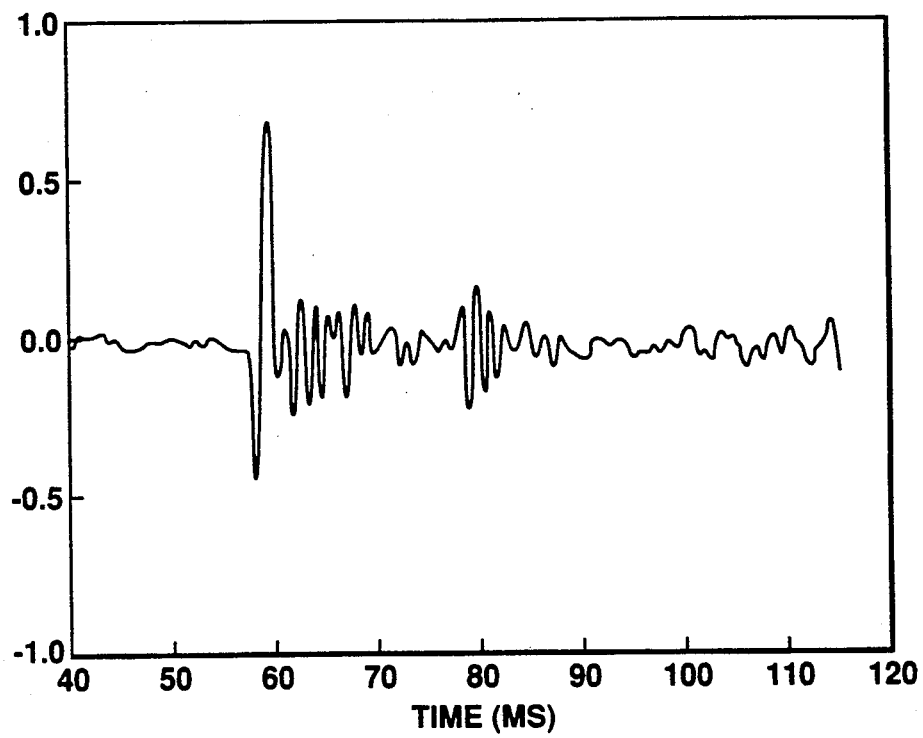
FIG. 9 is a plot of vertical motion recorded with the instrument of the present invention.
Figure 10:
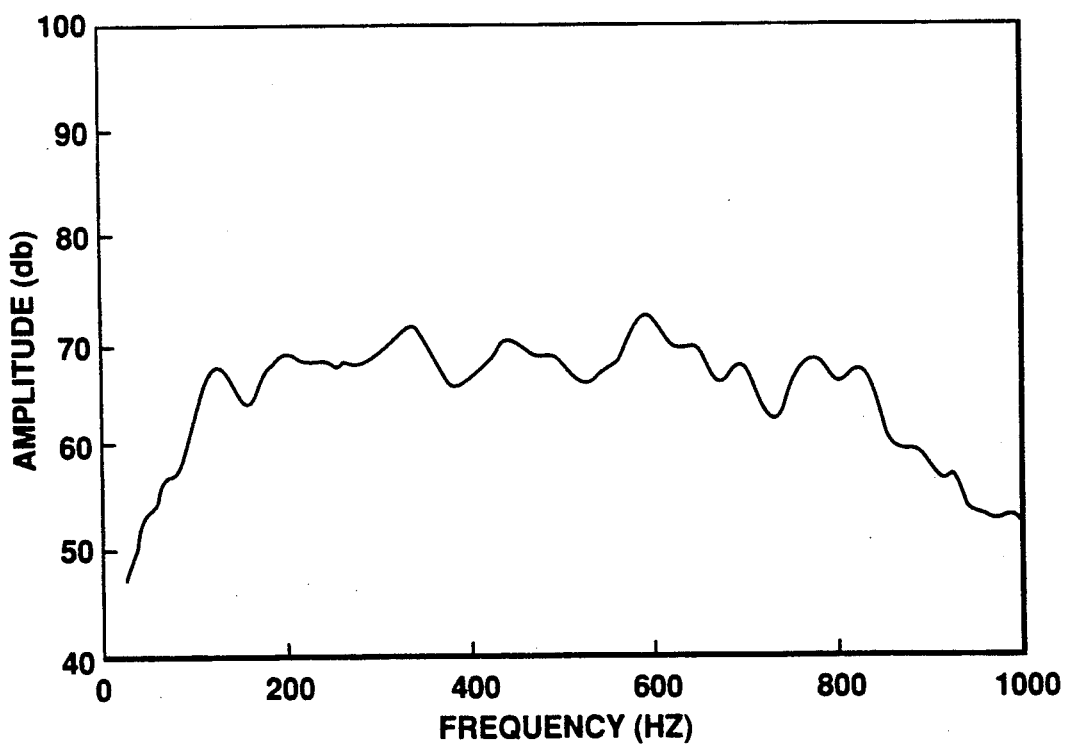
FIG. 10 is a plot of the amplitude spectrum for the data shown in FIG. 9.

Vertical motion recorded with a tool having embodiments of the present invention is shown in FIG. 9. The detector unit weighed about 14 pounds and was clamped with a force of about 200 pounds. The recording configuration is the same as described above. The data shows clean pulses without ringing. Furthermore, the arrival of a second event can be identified. There are no large amplitude peaks in the amplitude spectrum as shown in FIG. 10, and the amplitude is relatively flat up to 800 Hertz. The output of the dynamite source was found to decrease at frequencies above 800 Hertz during these tests; however, lab measurements show that data can be used up to 1000 Hertz.

The preferred embodiments of the present invention have been described above. It should be understood that the foregoing description is intended only to illustrate certain preferred embodiments of the invention and does not intend to define the invention in any way. Other embodiments of the invention can be employed without departing from the full scope of the invention as set forth in the appended claims.

We claim:

1. An apparatus for detecting seismic waves in a borehole comprising:
    (a) a plurality of small, light-weight, flexibly connected clamping detector units, each of said detector units having an hydraulically activated clamp;
    (b) a hydraulic pressure source adapted to actuate said hydraulically actuated clamp on each of said plurality of clamping detector units;
    (c) conduit means connecting said hydraulic pressure source to said plurality of clamping detector units so that said clamping detector units may be hydraulically clamped to a borehole with a large force by activation of said hydraulically activated clamps; and
    (d) means for conditioning signals from said clamping detector units and transmitting them to the surface of said borehole.

2. An apparatus in accordance with claim 1 wherein said hydraulic pressure generating source is a downhole hydraulic pump.

3. An apparatus in accordance with claim 1 wherein said hydraulic pressure source is a cable incorporating a hydraulic line wherein said pressure is generated at the surface of the borehole.

4. An apparatus in accordance with claim 1 wherein said clamping detector unit comprises at least one geophone enclosed in a light-weight housing.

5. An apparatus in accordance with claim 1 wherein said clamp comprises a locking arm which is moveable radially outward to contact the borehole wall and a hydraulic piston unit cooperating with said locking arm that converts hydraulic pressure from said hydraulic generating source to mechanical motion to move said arm.

6. An apparatus in accordance with claim 5 wherein a pressure in a piston cavity defined by said hydraulic piston unit is equalized to a pressure in said borehole surrounding said detector units by equalization means.

7. An apparatus in accordance with claim 6 wherein said equalization means comprises an expanding bladder located in said detector unit.

8. An apparatus in accordance with claim 1 wherein said means for conditioning signals from said clamping detector units comprises a digitizer unit.

9. An apparatus in accordance with claim 1 wherein said means for conditioning signals from said clamping detector units comprises a special line comprising a stress member to support the apparatus, a pair of wires for each detector to send electrical signals from the detector to the surface of said borehole.

10. An apparatus in accordance with claim 1 wherein said clamping detector units are spaced apart at different depths in a wellbore for simultaneous recording of signals from said clamping detector units at said different depths.

11. An apparatus in accordance with claim 8 wherein said different depths are from 2 to 50 feet apart.

12. An apparatus in accordance with claim 8 wherein said different depths are from 2 to 25 feet apart.

13. An apparatus in accordance with claim 1 wherein said conduit means comprises a single hydraulic hose.

14. An apparatus for detecting seismic waves in a borehole comprising:
 (a) a plurality of small, light-weight, clamping detector units, each of said units having an hydraulically actuated clamp;
 (b) a hydraulic pump adapted to actuate said hydraulically actuated clamp on each of said plurality of clamping detector units;
 (c) conduit means connecting said pump to said clamping detector units so that said clamping detector units may be hydraulically clamped to a wellbore with a large force by activation of said clamps; and
 (d) a digitizer connected to said clamping detector units to condition signals from said detector units.

15. An apparatus for detecting seismic waves in a borehole comprising:
 (a) a plurality of clamping detector units, each of said units comprising at least one geophone enclosed in a light-weight housing having an hydraulically actuated locking arm which moves outwardly to engage the borehole wall and a piston unit adapted to actuate said locking arm;
 (b) a hydraulic pump, said hydraulic pump adapted to actuate said piston unit on each of said plurality of clamping detector units;
 (c) conduit means comprising a hydraulic hose connecting said pump to said clamping detector units so that said clamping detector units may be hydraulically clamped to a wellbore with a large force by activation of said locking arms;
 (d) equalization means for equalizing a pressure in a piston cavity defined by said hydraulic piston unit to a pressure in said borehole surrounding said detector units; and
 (e) a digitizer connected to said geophones by a plurality of wires to condition signals simultaneously from said geophones.

* * * * *